Oct. 10, 1967  A. S. CZUBAK ET AL  3,345,938

AUTOMATIC STAMPING MECHANISM

Filed July 7, 1965  7 Sheets-Sheet 1

INVENTORS
ALBIN S. CZUBAK
GERALD A. HUBBLE

BY

Bower & Patalidis

ATTORNEYS

INVENTORS
ALBIN S. CZUBAK
GERALD A. HUBBLE
BY
Bower & Patalidis
ATTORNEYS

INVENTORS
ALBIN S. CZUBAK
GERALD A. HUBBLE
BY
*Bower & Patalidis*
ATTORNEYS

Oct. 10, 1967  A. S. CZUBAK ET AL  3,345,938
AUTOMATIC STAMPING MECHANISM
Filed July 7, 1965  7 Sheets-Sheet 4

INVENTORS
ALBIN S. CZUBAK
GERALD A. HUBBLE
BY

ATTORNEYS

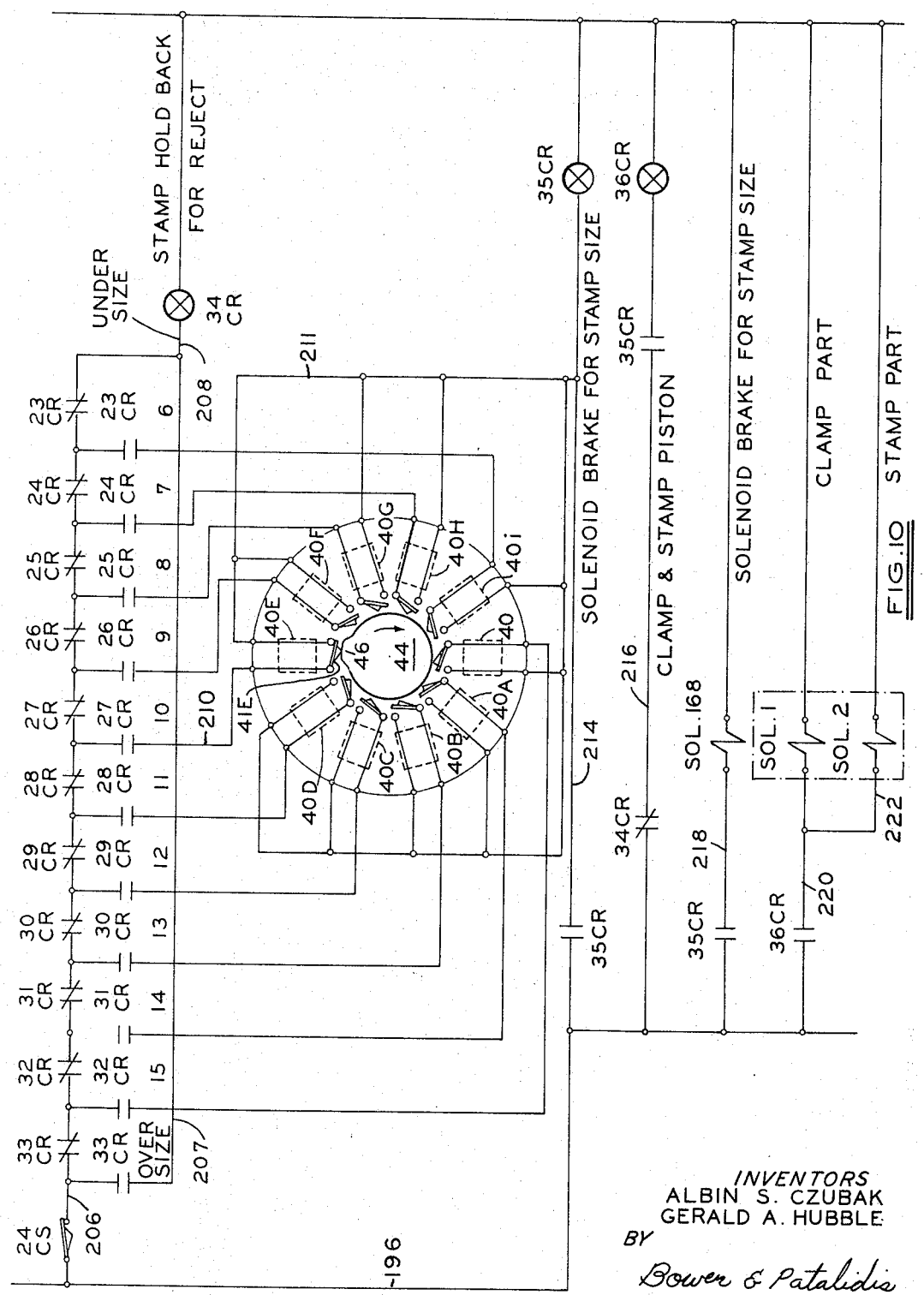

United States Patent Office 3,345,938
Patented Oct. 10, 1967

3,345,938
AUTOMATIC STAMPING MECHANISM
Albin S. Czubak and Gerald A. Hubble, Detroit, Mich., assignors to Micromatic Hone Corporation
Filed July 7, 1965, Ser. No. 470,166
1 Claim. (Cl. 101—43)

ABSTRACT OF THE DISCLOSURE

An automatic stamping mechanism that selects the proper gage number and impresses this number on the surface of the gaged workpiece.

---

This invention relates to an automatic stamping station and more particularly to a stamping mechanism which will automatically stamp the size of the workpiece more quickly and efficiently than has been heretofore possible with previously known types.

In a preferred embodiment of the invention the machine is adapted to be controlled from information supplied by previous gaging stations which information is then supplied to the stamping station from whence the proper gage size is stamped on the workpiece.

Movement of the stamping mechanism is controlled by mechanism which provides accurate control of the stamping head. The mechanism that controls the stamping on the piston is controlled through various switches and relays which have been determined by various gages.

Accordingly, it is an object of this invention to provide an automatically controlled stamping mechanism which is capable of stamping the proper size of a workpiece in a continuous, automatic cycle of operation.

With these and other objects in view, which will become apparent from the following description, the invention includes certain novel features of construction and combination of parts, the essential elements of which are set forth in the appended claims, a preferred form or embodiment of which will hereinafter be described with reference to the drawings which accompany and form a part of this specification.

Figure 2:
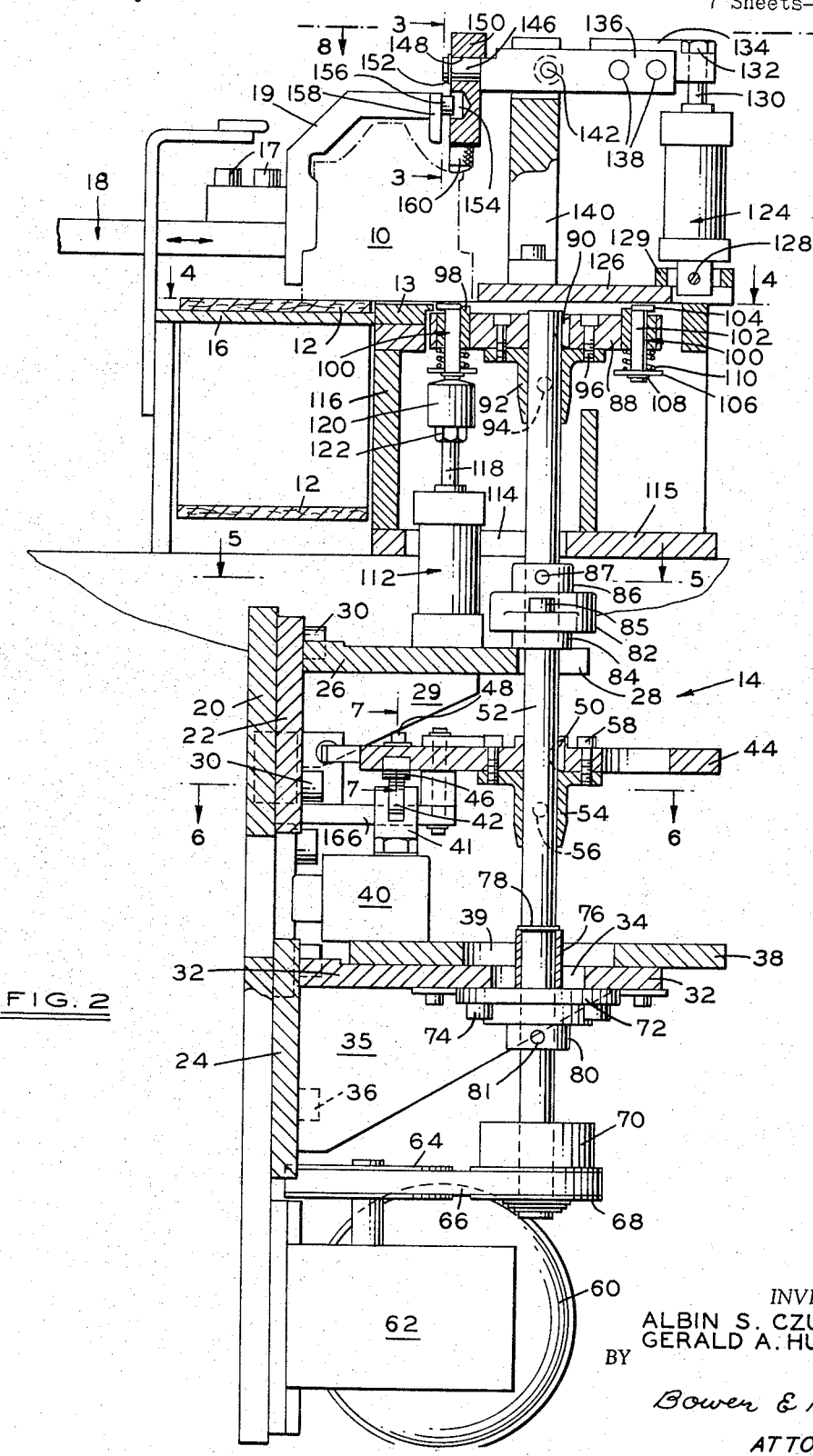
FIG. 2 is a cross-sectional view of the stamping station mechanism.
Figure 9:
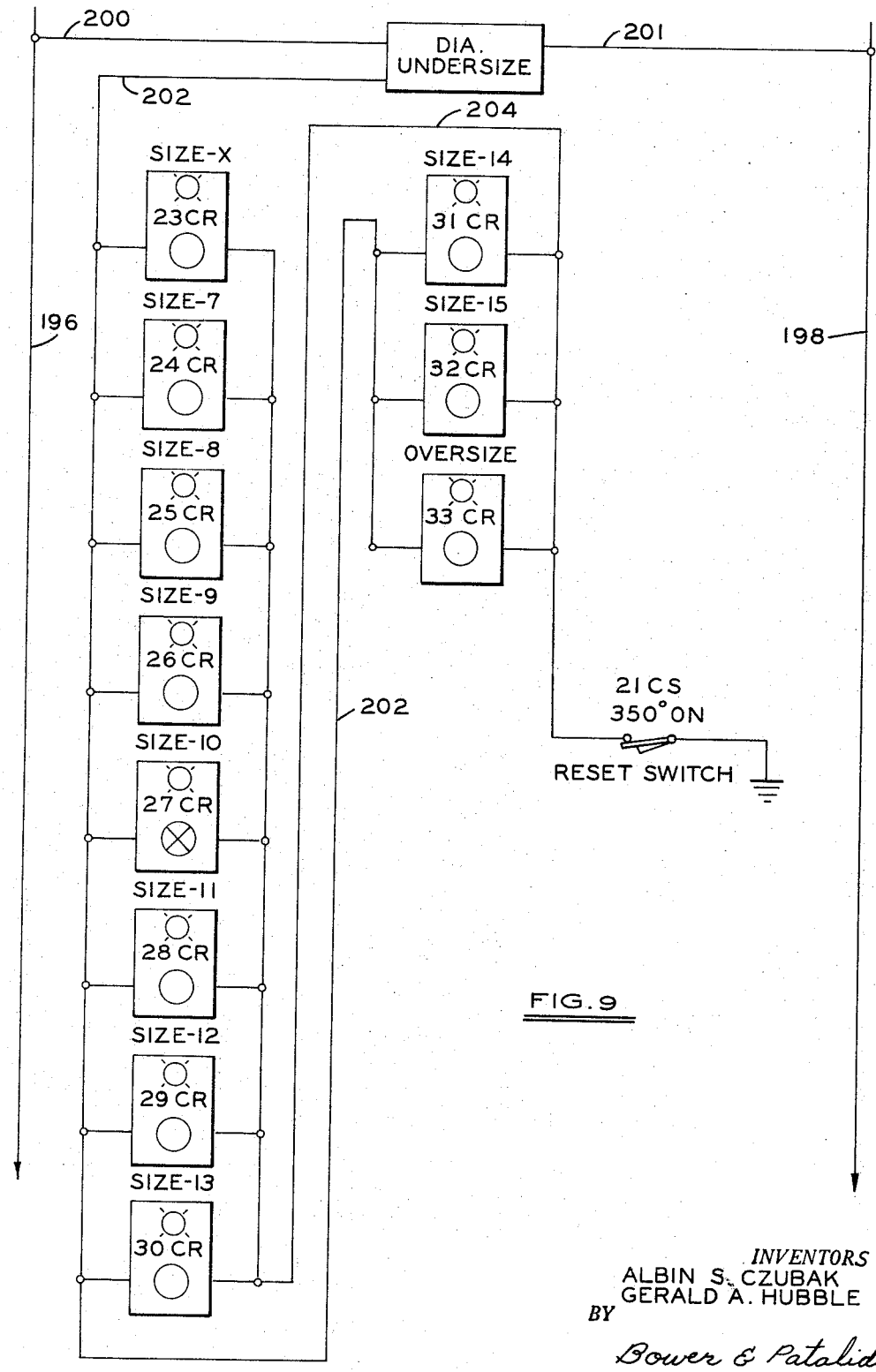

FIGS. 3 through 8 are cross-sectional views taken along line 3—3, 4—4, 5—5, 6—6, 7—7 and 8—8 respectively of FIG. 2;

FIGS. 9 and 10 are schematic views showing the circuits employed in conjunction with the stamping station mechanism.

Figure 1:
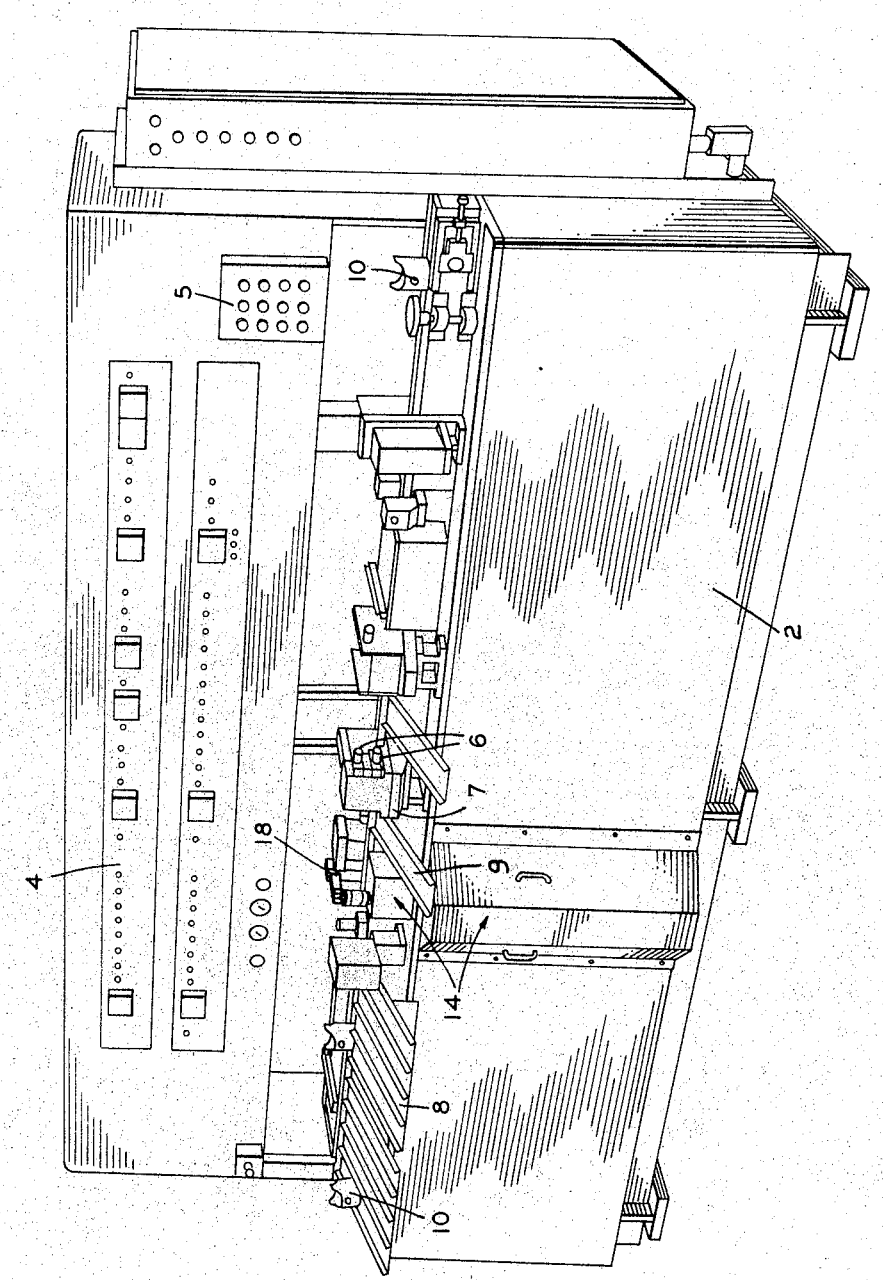
FIG. 1 is an isometric view of a piston gaging machine.

As shown in FIG. 1, the novel apparatus of the present invention is illustrated as applied to a piston gaging machine having a base 2 with a meter panel arrangement 4, a button panel arrangement 5 and a gaging station 7. The piston gaging station 7 includes gages 6 for gaging a piston 10 as to dimensions of height, taper and diameter. Such gages are well known in the art and form no part of this invention; however for purposes of identification gages such as shown in the following U.S. Patents: 2,254,-812 issued Sept. 2, 1941; 2,635,748 issued Apr. 21, 1953; 2,748,936 issued June 5, 1956; 2,828,873 issued Apr. 1, 1958; 2,908,406 issued Oct. 13, 1959; 2,913,829 issued Nov. 24, 1959; 2,956,665 issued Oct. 18, 1960 and 2,956,-378 issued Oct. 18, 1960. After the piston is gaged for size it is either rejected, and detoured down chute 9, or proceeds to the next station, the piston stamping station 14, where the stamping mechanism stamps a number corresponding to the size gaged. After the piston is gaged and stamped, the piston 10 proceeds along to where it is segregated into proper sizes, previously determined, by an arm that pushes the piston down one of the chutes 8.

FIG. 2 shows a piston 10 held in stationary relationship prior to stamping. The piston is adapted to be moved from the moving belt 12 partially onto a frame base portion 13 of the piston stamping mechanism. The moving belt 12 is an endless type in which the top portion of the moving belt slides on the base 16, as shown in FIG. 1, and provides movement of piston 10 along prior gaging stations. Piston 10 is adapted to be moved from the moving belt 12 by an arm 18 into the stamping station in a manner disclosed by the application of Albin S. Czubak, Ser. No. 461,466, filed June 4, 1965, group No. 340.

The arm 18 includes a piston engaging portion 19 which is secured to the arm 18 by cap screws 17. However, it is well known and obvious to anyone skilled in the art to substitute any other piston engaging portion.

Figure 6:
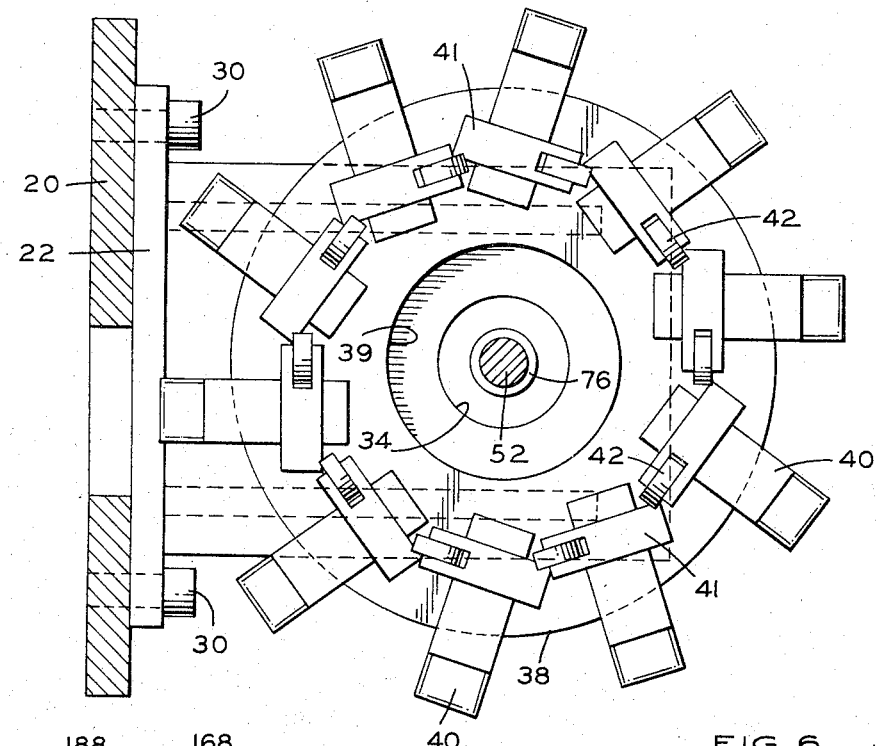

Directly beneath the endless belt conveyor a vertical mounting plate 20 is mounted onto a base of the machine, said plate having a top adjustable plate 22 and a bottom adjustable plate 24. The adjustable plate at the top includes a platform 26 with a slot 28 for the purpose to be hereinafter disclosed. The adjustable plate at the top includes side support brackets 29 to provide support thereof. Cap screws 30 mount the adjustable top plate to the mounting plate 20. The adjustable bottom plate 24 includes a platform 32 with an opening 34 and also includes side support brackets 35. Cap screws 36 mount the adjustable bottom plate onto the mounting plate 20. Secured onto the platform 32 is a switch mounting plate 38 having an opening 39 for the purpose to be disclosed. Mounted on top of the switch mounting plate 38 are microswitches 40. include an arm 41, as seen in FIG. 6, and rollers 42 attached thereto. Directly above the switch mounting plate assembly is an index plate 44 which has a cam 46 mounted on the under surface of said index plate. Cap screws 48 secure the cam 46 onto the bottom on index plate 44. The index plate 44 is mounted on a shaft 52 by a key 50 and further secured to the shaft 52 by means of being secured to flange 54 by cap screws 58. Flange 54 is secured to the shaft 52 by a pin 56. A motor 60 is mounted on the mounting plate 20 for the purpose of providing rotation to the shaft 52. This is accomplished by means of a speed reducer 62 adapted to rotate a pulley 64. Pulley 64 in turn drives an endless belt 66 causing rotation of a pulley 68 which is secured to the shaft 52 by means of a slip clutch 70. The slip clutch 70 is a commercial type in which patentability is not predicated upon; however, for the purpose herein disclosed it is of the type which causes rotation of shaft 52 but when shaft 52 is restricted from rotation the pulleys will still rotate. In other words, rotation of shaft 52 is indirectly coupled by means of slip clutch 70 to provide a stop and go situation for the purpose to be disclosed herein.

The journal or pillow block 72 is secured to the platform 32 by means of cap screws 74. A spacer 76 is mounted axially on the shaft 52 and prevented from axial movement by means of a retaining ring 78. A retaining hub 80 is secured to the shaft 52 by means of cap screws 81.

A second journal or pillow block 82 is secured to a spacer 84 by means of cap screws 85. A retaining hub 86 is mounted on the shaft and secured thereto by means of cap screws 87. The retaining hubs 80 and 86 are adapted to be rotated with the shaft 52, and yet provide support of the shaft by being retained on its outer diameter by the journals or pillow blocks 72 and 82 respectively, the means for which are well known in the art and the invention of which is not specifically claimed.

Figure 4:
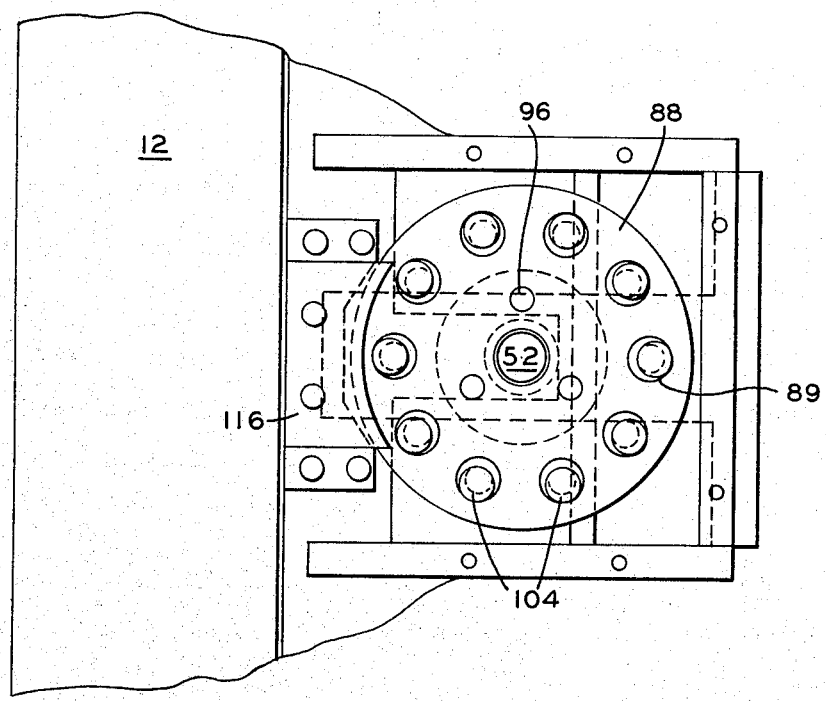

Mounted on the uppermost portion of shaft 52 is the stamping plate 88. A key 90 prevents movement of the stamping plate with respect to the shaft 52. Flange 92 is secured to the shaft 52 by means of a pin 94 and cap screws 96 secure the stamping plate to the flange 92. As shown in FIG. 4, the stamping plate 88 includes openings 89. These openings accommodate a bushing 98 and a stamp assembly 10. In the preferred embodiment shown in FIG. 4, there are ten such openings providing ten stamps. However, it is well understood that the number of openings is not restricted to any set amount but is determined largely by the number of sizes desired to be stamped. Each stamp assembly includes a shaft 102 on the end of which the numbered face of the stamp is secured. The other end of shaft 102 includes a washer 106 retained on the shaft 102 by a retaining ring 108. A spring 110 maintains the standard assembly in a biased position at all times.

Figure 3:
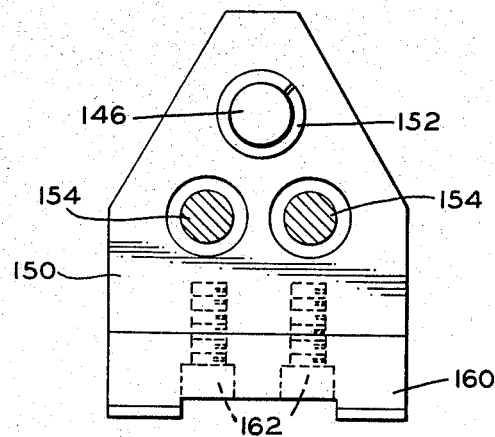

Mounted on the platform of the adjustable top plate 22 is a hammer cylinder 12. The hammer cylinder 112 extends through an opening 114 in a bottom plate 115. The cylinder 112 includes a shaft 118 having a hammer or bumper 120 mounted on the end thereof and further includes a nut 122 to adjust the position of the hammer 120 on the shaft 118. Mounted on the frame base 126 by means of a mounting plate 129 is a second clamp cylinder 124. The clamp cylinder 124 is mounted to the plate 129 by a swivel joint 128 for the purpose to be defined. The cylinder 124 includes a shaft 130 which is connected to a first connecting plate 134 and secured thereto by means of a nut 132. The first connecting plate is secured to a second connecting plate 136 by means of cap screws 138. The second connecting plate 136 is mounted on a pivot block 140 by means of a pivot pin 142. The second connecting plate includes a circular shaft 146 which extends through opening 148 of the holding blocks 150 and is retained by a retaining ring 152. The holding block 150 includes recesses 154, as shown in FIG. 3, and includes at its lower portion a stop 160 which is secured to the holding block by cap screws 162. The stop 160 can be made of nylon, or other material, and engages the top portion of the piston thereby providing an abutting surface to the top of the piston as the piston is being stamped from the bottom. It is therefore apparent that the movement of rod 130 connected to the piston of cylinder 124 provides for pivotal movement of holding block 150 against any upward movement of the piston as it is being stamped from the bottom.

Mounted on the arm 19 is a stop shoulder 158 and a pair of circular pegs which enter the recesses 154 of the holding block 150. The position of piston 10 is maintained by means of piston engaging portion 19 holding the piston in proper position. The clamp cylinder 124, when energized, provides a force holding the piston down onto the stamp base portion 13.

Figure 5:
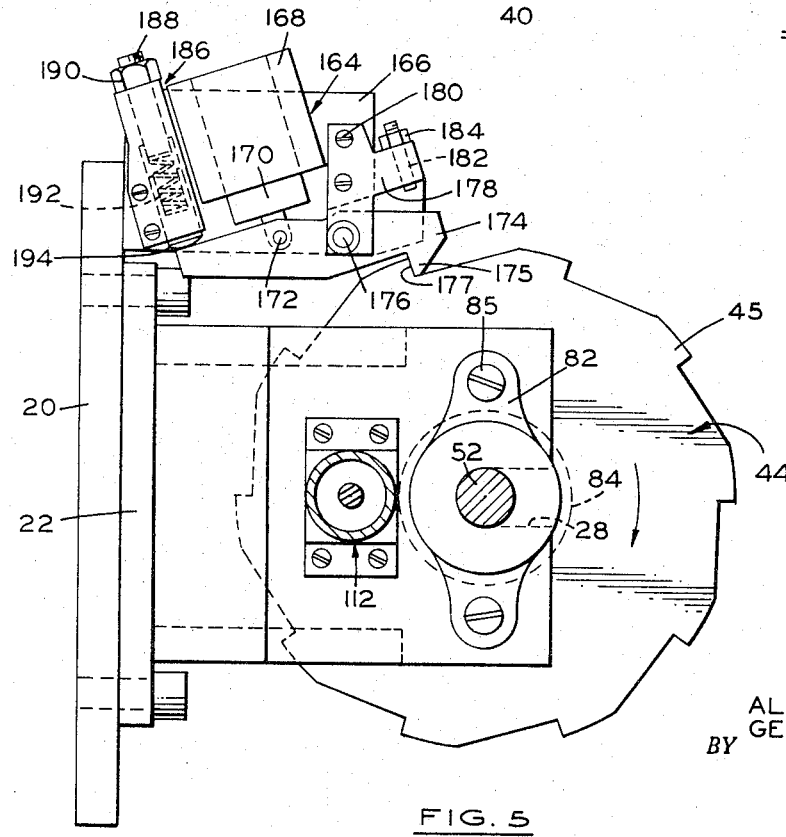

Shown in FIG. 5 is the locking assembly for the index plate 44. The locking assembly includes a support 166 on which a solenoid or relay 168 is mounted. The solenoid or relay 168 includes a plunger 170 which is pivotally secured at 172 to the stop arm 174. A second pivot 176 is mounted to a bracket 178 which also is mounted on the support 166. An adjusting screw 182 provides for extent of retractive travel of the stop arm 174 and is adjustable by means of a nut 184. A plunger block 186 is also mounted on the support to provide for a resilient or breaking effect to th stop arm 174. It includes an adjusting screw 188 with a nut 190 which secures the adjusting screw to the plunger block 186. A spring 192 is centrally positioned and biases the slideable bearing 194 against the locking arm 174. When the solenoid or relay 168 is energized, stop arm 174 is caused to move in a counterclockwise direction, whereby the jaw 175 of arm 174 is adapted to engage the flat portion 177 of the outwardly protruding elements or teeth 45 on the index plate 44.

*The control circuit*

The foregoing mechanical and hydraulic arrangements are arranged, according to the invention, to be electrically controlled, and capable of automatic operation. That is to say, starting, positioning, and stopping of the stamping station assembly under a piston to be stamped is performed automatically according to a preselected order by the apparatus according to this invention.

Position sensing of the stamping station assembly is obtained through the medium of the circuits shown in FIGS. 9 and 10. FIG. 9 shows a series of relays or any other means which are energized as a result of the piston being gaged. Assuming that a piston is gaged as UNDERSIZE, and as shown in FIG. 9, none of the relays size X through size 15 and including OVERSIZE have been energized; power passes through all of the normally closed contacts, as shown in FIG. 10, 33CR, 32CR, 31CR, 30CR, 29CR, 28CR, 27CR, 26CR, 25CR, 24CR and 23CR to energize relay 34CR. When relay 34CR is energized normally closed contacts 34CR on line 216 are opened thereby preventing power from entering and energizing the CLAMP & STAMP PISTON relay 36CR. However, assuming a piston is not gaged as UNDERSIZE, but is gaged as OVERSIZE, the OVERSIZE relay 33CR, shown in FIG. 9, is energized and, as shown in FIG. 10, the power coming in on line 206 is prevented from going past the contacts 33CR on line 206, since the normally closed contacts of 33CR on line 206 are now open and the normally open contacts of switch 33CR on line 207 are now closed. Power therefore bypasses the normally closed contacts on line 206 and goes directly to energize relay 34CR on line 208. Relay 34CR is the STAMP HOLD BACK FOR REJECT which, when energized, opens the normally closed contacts 34CR on line 216 thereby preventing the CLAMP & STAMP PISTON relay 36CR to be energized. This, of course, prevents energization of the relays that causes the piston to be stamped by the stamping mechanism. The arm 19 retracts the piston from the stamping station, and the movement of the belt or conveyor 12 causes movement of the piston past the stamping station to the next station, shown in FIG. 1, where an arm is adapted to push the piston down off the moving belt 12 down through chute 9 to a bin marked for rejection of the part. The above two examples described relay an event if the piston is gaged as being either UNDERSIZE or OVERSIZE.

Assuming that a piston is now being gaged such that it would fit into the several categories as determined for the purpose intended, such being any size of the piston that has been predetermined as allowable within certain gage limits. Assuming that such a piston is gaged as a size 10, as shown by an X in FIG. 9, relay 27CR would be thus energized. As shown in FIG. 10 since relay 27CR is energized the normally closed contacts 27CR on line 206 are now open and the normally open contacts of 27CR are now closed; power coming in from line 196 through line 206 now is detoured to cam switch 40E. As yet, 40E may not be closed; however, viewing FIG. 2, FIG. 5, and FIG. 10 from the above mentioned disclosure, the cam 46 attached to the bottom surface of the index plate 44, adapted to be rotated at a predetermined speed, contacts the rollers 42 on switch arms 41 of switches 40. Rotation of the index plate 44 continues until the cam 46 moves the arm 41e and closes the contacts of switch 40e causing power to enter through lines 210, 211 and 214 to energize SOLENOID BRAKE FOR STAMP SIZE relay 35CR. Energizing relay 35CR closes the normally open contacts 35CR on line 216 and on line 218. Closing of the contacts 35CR on line 218 causes power from line 196 to energize solenoid SOL 168, the SOLENOID BRAKE FOR STAMP SIZE, and as shown in FIG. 5, energization of solenoid 168 will rotate arm 174 about pivot 176 and cause the jaw 175 to move against the surface portion 177 of tooth 45 on index plate 44, thereby preventing further rotation of index plate 44. Since index plate 44 is secured to shaft 52, rotation thereof is also prevented. The stamping plate 88 secured to shaft 52 is also prevented from further rotation and is adapted therefore to be properly aligned for the size 10 stamp to be impressed on the bottom of piston 10.

Closing of the contacts 35CR on line 216 causes power from 196 to energize CLAMP & STAMP PISTON relay 36CR. Contacts 34CR on line 216 remain closed due to the fact that relay 34CR on line 208, STAMP HOLD BACK FOR REJECT is not energized. Energization of relay 36CR will close the normally open contacts 36CR on line 220 and causes power from line 196 to energize SOL 1 and SOL 2, CLAMP PART and STAMP PART respectively. Energization of the solenoid SOL 1 is adapted to cause fluid to enter cylinder 124 and expand the piston thereby extending rod 130 and move the clamping block 150 into abutting engagement on the top portion of piston 10 whereby the piston is prevented from vertical travel or movement thereby. Energization of SOL 2 is adapted to cause fluid to enter cylinder 112 and expand the piston thereby extending rod 118 and hammer or bumper 120 against the stamp assembly 100 with such force as to cause the face of the stamp 104, in the above exemplified explanation being a size 10, being secured to shaft 102 is then impressed on the surface of piston thereby providing a permanent record of the size of the piston gaged.

Figure 8:
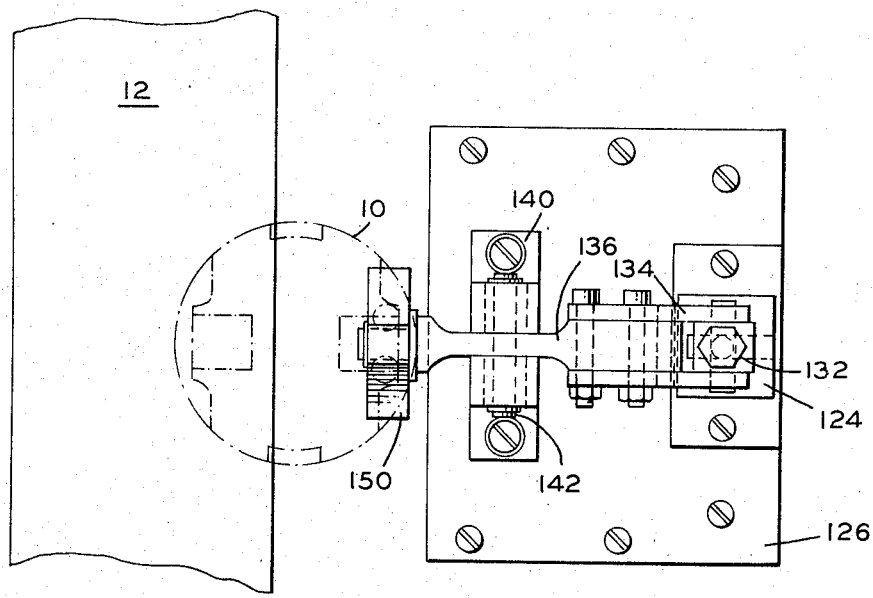
Figure 7:
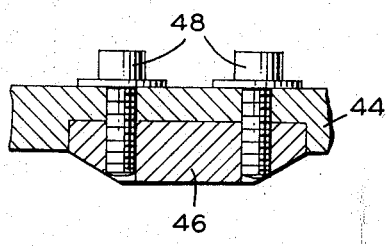

To reset the gage relays, a reset switch 21CS, as shown in FIG. 8, is opened for approximately 10 degrees of its rotation, thereby de-energizing all the gage relays in preparation for the next piston to be gaged.

While in the foregoing description the invention was explained in connection with one possible form or embodiment thereof, wherefore certain specific terms and language have been used herein, it is understood that the present disclosure is illustrative rather than restrictive and that changes and modifications may be resorted to without departing from the spirit of the invention as defined by the claims.

For example, a variation of the above disclosed invention is to provide the movement of the switches in a rotary fashion, and to effect stopping of the stamping plate assembly in a similar fashion described above. That is, the index plate would be stationary and the switch mounting plate would be coupled to the shaft and rotated thereby. Upon energization of the proper switch in a manner similar to the above described preferred embodiment, the stamping plate would be located in the proper position prior to stamping the size on the piston. Of course, to effect the rotation of the switch mounting plate, various means could be provided to provide for electrical contact thereto, as by slip rings or some other simple electrical connecting engagement.

What is claimed is:
A piston head stamping mechanism comprising:
(a) a support means;
(b) motor means mounted on said support means;
(c) shaft means mounted on said support means;
(d) slip clutch means connected between one end of said shaft and said motor means adapted for intermittent rotation of said shaft;
(e) a stamping plate connected to the opposite end of said shaft and adapted to rotate therewith;
(f) said stamping plate including a plurality of bores circumferentially spaced;
(g) a stamp means comprising;
 (1) a shaft having a numbered face on one end and a spring and retaining washer on the other end providing a bias means, said stamp means adapted to be retained in said bores in said stamping plate;
(h) a cylinder mounted on said support means beneath said stamp means having a hammer means on the end thereof and adapted to hammer one of said stamp means when said stamping plate is stationary and one of said stamp means is in line with said hammer means;
(i) an index plate mounted on said shaft beneath said stamping plate and said support means and having a cam secured to the undersurface said index plate including a plurality of teeth on the circumference thereof;
(j) a switch mounting plate mounted on said shaft beneath said index plate and having a plurality of microswitches mounted thereon, each of said microswitches having arms with rollers connected thereto, said rollers adapted to selectively contact said cam mounted on said undersurface of said index plate;
(k) locking means mounted on said support means and having a stop arm adapted to selectively engage one of said plurality of teeth on said circumference of said index plate;
(l) position sensing means comprising:
 (1) relay means adapted to be energized as a result of a piston being selectively gaged;
 (2) circuit means interconnecting said relay means to said locking means whereby when one of said microswitches is energized when its roller contacts said cam on said index plate, said index plate is locked by said locking means thereby stopping rotation of said stamping plate and providing alignment of the selected number on said stamping plate directly in line with said piston head; and
(m) piston head holding means adapted to hold said piston head in proper alignment when said piston is being stamped by said hammer and stamp assembly means.

References Cited

UNITED STATES PATENTS

| | | | |
|---|---|---|---|
| 1,114,917 | 10/1914 | Schettler | 101—43 |
| 1,207,161 | 12/1916 | Goldsmith | 101—43 |
| 1,406,537 | 2/1922 | Choate | 197—6.7 |
| 1,504,598 | 8/1924 | Bergen | 197—6.7 |
| 2,315,868 | 4/1943 | Metcalf | 33—147 |
| 2,373,941 | 4/1945 | Benning | 101—43 |
| 2,647,456 | 8/1953 | Aller et al. | 101—43 |
| 2,677,325 | 5/1954 | Aller | 101—43 |
| 2,770,047 | 11/1956 | Maubey | 33—147 |
| 3,099,954 | 8/1963 | Folk | 101—43 |

WILLIAM B. PENN, *Primary Examiner.*